United States Patent
Inoue et al.

(10) Patent No.: US 6,550,975 B2
(45) Date of Patent: Apr. 22, 2003

(54) BEARING APPARATUS FOR VEHICLE

(75) Inventors: Masahiro Inoue, Nara (JP); Yoshifumi Shige, Nara (JP); Koji Shima, Hyogo (JP); Setsuji Suzuki, Aichi (JP); Makoto Okada, Aichi (JP); Seiji Hojo, Aichi (JP); Koichi Aida, Aichi (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/011,873

(22) Filed: Oct. 22, 2001

(65) Prior Publication Data

US 2002/0048419 A1 Apr. 25, 2002

(30) Foreign Application Priority Data

Oct. 25, 2000 (JP) ........................................ 2000-325386

(51) Int. Cl.$^7$ ................................................ F16C 19/08
(52) U.S. Cl. ........................ 384/537; 384/517; 384/544
(58) Field of Search ................................ 384/537, 544, 384/517, 589, 585

(56) References Cited

U.S. PATENT DOCUMENTS 5,725,285 A    3/1998   Niebling et al.

FOREIGN PATENT DOCUMENTS

| JP | 2000-142009 | 5/2000 |
| JP | 2000-142015 | 5/2000 |

*Primary Examiner*—Lenard A. Footland
(74) *Attorney, Agent, or Firm*—Jordan and Hamburg LLP (57) ABSTRACT

In a construction in which a double row rolling bearing and a constant velocity joint are mounted to a hub wheel, a fixing ring fixedly mounted to a vehicle-outer side opening of the hub wheel is sandwiched between a vehicle-outer side end face of an outer ring shaft of the constant velocity joint and a bolt integrally mounted to the shaft in the axial direction, thereby coupling the outer ring of the constant velocity joint to the hub wheel. In this case, a simple coupling operation only for mounting the bolt to the shaft suffices, and a pre-load that has been applied to the rolling bearing is maintained invariably.

10 Claims, 7 Drawing Sheets

BEARING APPARATUS FOR VEHICLE

BACKGROUND OF THE INVENTION

1. Field of the Invention

The present invention relates to a bearing apparatus for a vehicle, and more particularly, to a bearing apparatus for a vehicle for rotatably supporting wheels of an automobile.

2. Description of the Related Art

Figure 7:
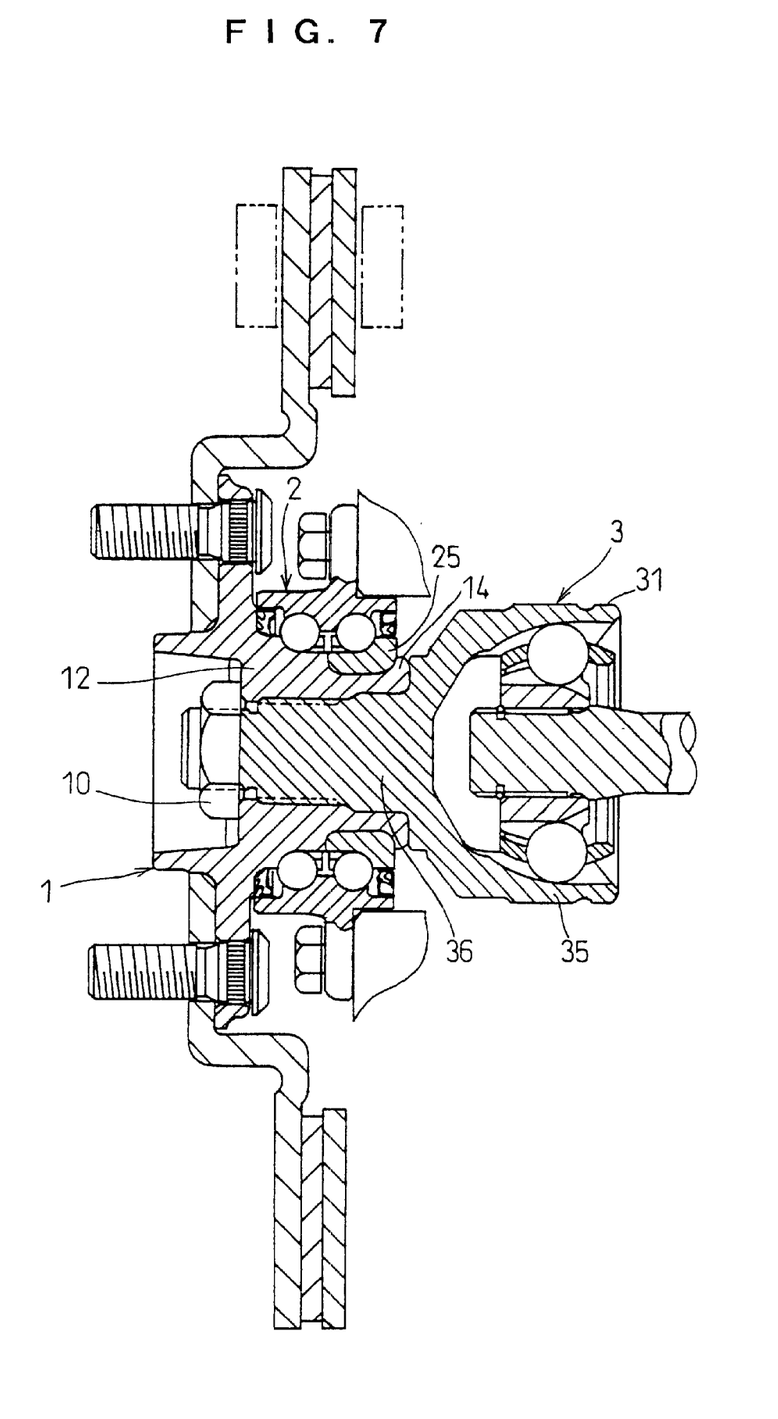
FIG. 7 is a sectional view of a conventional bearing apparatus.

Referring to FIG. 7, a conventional bearing apparatus for a vehicle will be explained. The term "vehicle-inner side" herein means right side in the drawings, and the term "vehicle-outer side" means left side in the drawings.

This bearing apparatus includes a hub wheel 1, a double row type rolling bearing 2 and a constant velocity joint 3. The hub wheel 1 has a hollow hole in its axial direction. An outer ring 31 of the constant velocity joint 3 includes a cup-like cylindrical portion (outer ring cylindrical portion) 35, and a shaft (outer ring shaft) 36 continuously formed on this in the direction of the vehicle-outer side. The outer ring shaft 36 is spline fitted to the hollow hole of the hub wheel 1. A vehicle-inner side end of the hub wheel 1 is bent radially outward, thereby the end is caulked against an end face of an inner ring 25 of the rolling bearing 2 on the vehicle-inner side. The caulked vehicle-inner side end of the hub wheel 1 is defined as a caulked portion 14. With this caulk, a necessary pre-load is applied to the rolling bearing 2, so that rolling characteristics of the rolling bearing 2 are secured.

On the other hand, a nut 10 having a head whose outer diameter is greater than the hollow hole of the hub wheel 1 is threadedly engaged around a vehicle-outer side end of the outer ring shaft 36. The hub wheel 1 is sandwiched by the threadedly engaged nut 10 and the outer ring cylindrical portion 35 of the constant velocity joint 3 between the vehicle-outer side and the caulked portion 14, which is the vehicle-inner side, from both of the opposite sides in the axial direction. With this construction, the outer ring 31 of the constant velocity joint 3 is coupled to the hub wheel 1.

In the case of such a coupling construction, if a fastening force of the nut 10 is weak, the outer ring 31 of the constant velocity joint 3 cannot be strongly coupled to the hub wheel 1 and thus, the fastening force of the nut 10 must be strong enough for the coupling mentioned above.

Therefore, the fastening force of the nut 10 tends to be excessively strong. In such a case, the caulked portion 14 of the hub wheel 1 is strongly pushed toward the vehicle-outer side from the outer ring 31 of the constant velocity joint 3 and compressed and deformed, and redundant load is prone to be applied to the rolling bearing 2.

In such a case, the redundant load against the rolling bearing 2 caused by the fastening of the nut 10 is applied to the rolling bearing 2 as pre-load in addition to a pre-load set by the caulking of the vehicle-inner side end of the constant velocity joint 3. Thus, the pre-load cannot be maintained properly, and there is a tendency that the rolling characteristics of the bearing 2 are deteriorated.

For the above reasons, in the case of the conventional bearing apparatus, the coupling operation of the outer ring 31 of the constant velocity joint 3 to the hub wheel 1 is required to be carried out under a predetermined condition, and this operation is ineffective and troublesome.

SUMMARY OF THE INVENTION

Therefore, it is a main object of the present invention to provide a bearing apparatus for a vehicle capable of coupling a constant velocity joint to a hub wheel with easy and effective operation, while properly keeping the pre-load to a rolling bearing.

Other objects, features and advantages of the present invention will be apparent from the following description.

A bearing apparatus for a vehicle of the present invention includes a hub wheel having a hollow hole, a rolling bearing mounted to an outer periphery of the hub wheel, a constant velocity joint for connecting an input shaft to the hub wheel such that the input shaft can incline, the constant velocity joint having an outer ring including a cylindrical portion in which an inclination guide element with respect to the input shaft is accommodated and a shaft (outer ring shaft) continuously formed on the cylindrical portion and fitted into the hollow hole of the hub wheel in a state in which the outer ring shaft is prevented from rotating in the hollow hole of the hub wheel in its circumferential direction, a pressing member mounted to the outer ring shaft of the constant velocity joint, and a fixing member whose outer diameter side is fixed to a predetermined position of the hub wheel on a vehicle-outer side and whose inner diameter side is smaller than the hollow hole of the hub wheel, wherein the fixing member is sandwiched between the pressing member and a vehicle-outer side end face of the outer ring shaft in the axial direction so that the outer ring of the constant velocity joint is coupled to the hub wheel.

The fixing member fixed to the hub wheel is sandwiched between the outer ring shaft of the constant velocity joint and the pressing member in the axial direction and thus, the outer ring of the constant velocity joint is coupled to the hub wheel.

Therefore, in the case of the bearing apparatus for a vehicle of the present invention, a simple coupling operation only for mounting the bolt to the shaft suffices, and a pre-load that has been applied to the rolling bearing is maintained invariably. As a result, a required pre-load may be applied to the rolling bearing only when the hub wheel 1 is caulked and thus, its management becomes easy.

In the present invention, preferably, a vehicle-outer side opening of the hollow hole of the hub wheel is increased in diameter to form a diameter-increased portion. The fixing member is fixed to in the diameter-increased portion of the hub wheel.

In the present invention, preferably, the fixing member is a fixing ring having an outer diameter side fitted and fixed to the diameter-increased portion of the hub wheel by press-fitting, a vehicle-outer side end of the outer ring shaft of the constant velocity joint has a screw hole, the pressing member is a bolt threadedly engaged in the screw hole, the fixing ring is sandwiched between the vehicle-outer side end face of the outer ring shaft and an inner end face of a head of the bolt threadedly engaged in the screw hole in its axial direction in a state in which the fixing ring is positioned at least in its axial direction.

In the present invention, preferably, the fixing member is fixed to the diameter-increased portion of the hub wheel by press-fitting. This press-fit force is set greater than an axial load applied to the outer ring of the constant velocity joint in a direction of the vehicle-outer side.

BRIEF DESCRIPTION OF THE DRAWINGS

These and other objects as well as advantages of the invention will become clear by the following description of preferred embodiments of the invention with reference to the accompanying drawings, wherein.

DETAILED DESCRIPTION OF PREFERRED EMBODIMENTS

Figure 1:
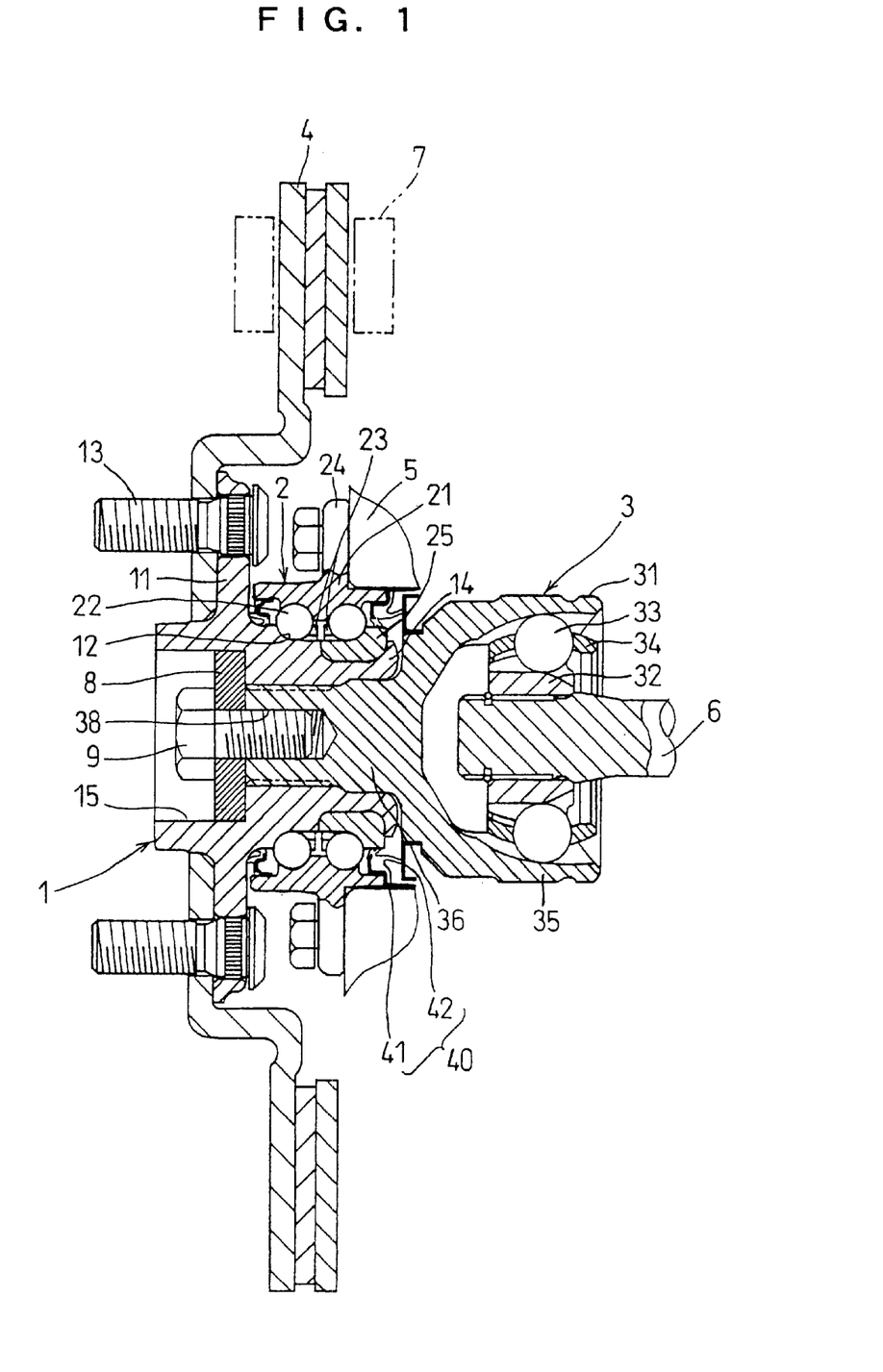
FIG. 1 is a sectional view showing a bearing apparatus for a vehicle of a preferred embodiment of the present invention.
Figure 2:
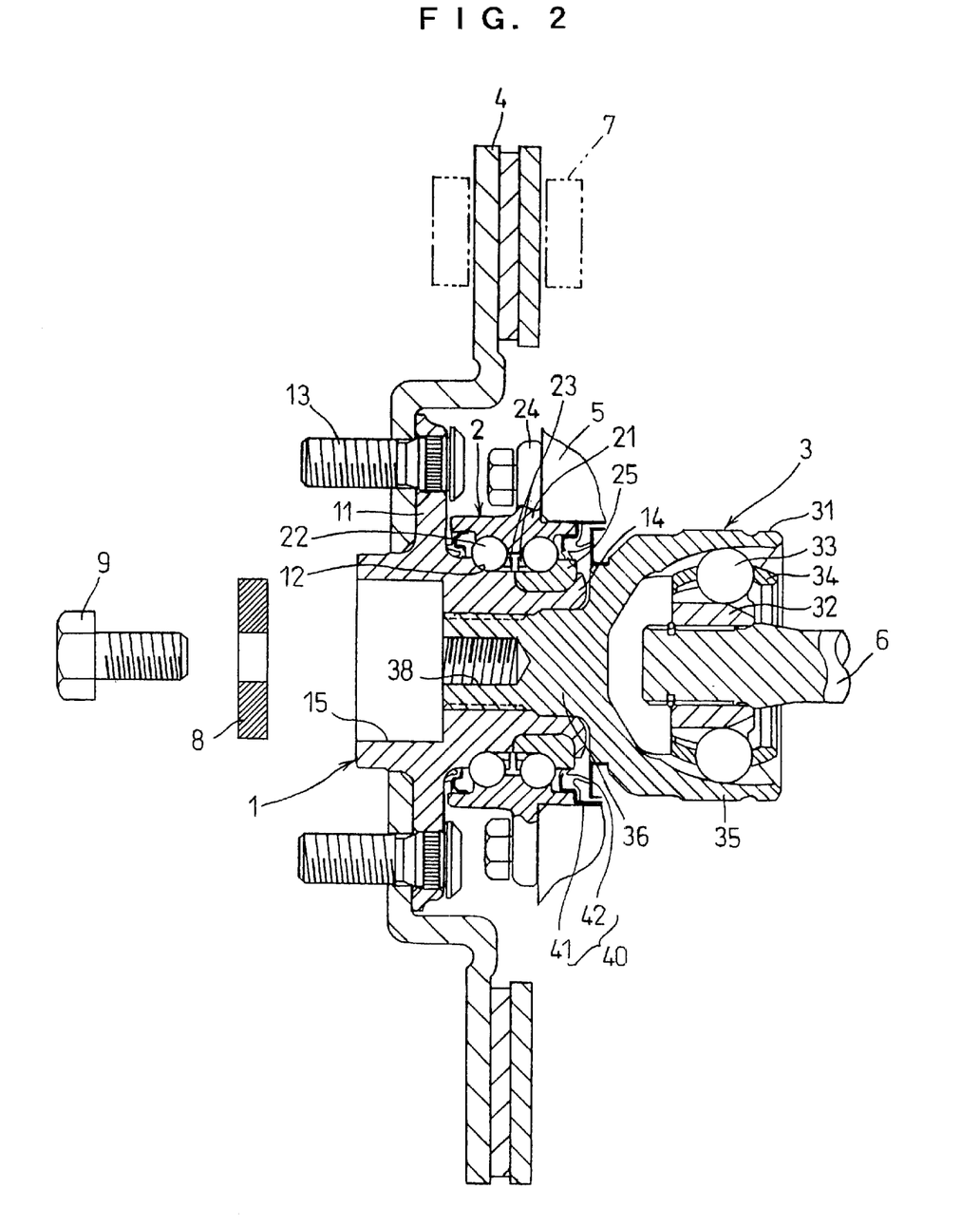
FIG. 2 is a view showing assembling process of the bearing apparatus shown in FIG. 1.

A bearing apparatus for a vehicle shown in FIGS. 1 and 2 is a type used for a driving wheel of an automobile, and includes a hub wheel 1, a rolling bearing 2 and a constant velocity joint 3.

The hub wheel 1 has a hollow hole passing through the hub wheel 1 in its axial direction, and is formed at its outer peripheral surface in the direction on the vehicle-outer side with a radially outward flange 11. The hub wheel 1 is, also, structured so as to be formed at its outer peripheral surface on the vehicle-inner side with respect to the flange 11 with an raceway surface 12 for a ball group 22 of the rolling bearing 2 on the vehicle-outer side.

The rolling bearing 2 is configured as a double row rolling bearing, and is consisted of a single outer ring 21 having two row raceway grooves in the axial direction, a plurality of balls 22 as rolling elements arranged in two rows, two crown-like retainers 23, and an inner ring 25 for the group of balls 22 on the vehicle-inner side. Since the raceway surface of the hub wheel 1 is utilized as described above, an inner ring of the group of balls 22 on the vehicle-outer side does not exist.

The constant velocity joint 3 is considered as a known pzeppa type (bar field type) constant velocity joint, and includes an outer ring 31, an inner ring 32, balls 33 and a retainer 34 in order to connect an input shaft 6 that inputs a rotation force such that it can incline. The outer ring 31 is consisted of a cup-like cylindrical portion (outer ring cylindrical portion) 35 in which inclining elements for the input shaft 6 mentioned above such as the inner ring 32, the balls 33, the retainer 34 and the like are accommodated, and a shaft (outer ring shaft) 36 integrally connected to a small-diameter side of the outer ring cylindrical portion 35.

The outer ring shaft 36 is formed at its outer peripheral surface with a male spline. A female spline is formed on an inner peripheral surface of the hollow hole of the hub wheel 1. The outer ring shaft 36 is inserted into the hollow hole of the hub wheel 1 and spline fitted therein by both of the splines mentioned above. This spline fit is set in such a state that a fastening margin is left between biting teeth.

The rolling bearing 2 is mounted to the outer peripheral surface of the hub wheel 1. The vehicle-inner side end of the hub wheel 1 is radially outwardly bent, and caulked against the vehicle-inner side end of the inner ring 25 of the rolling bearing 2 and defined as a caulked portion 14.

The constant velocity joint 3 is coupled to the hub wheel 1 in such a mode that the constant velocity joint 3 is adjacent to the rolling bearing 2.

A disk rotor 4 of a disk brake apparatus and a wheel (not shown) is placed on the flange 11 of the hub wheel 1 and mounted thereto by means of a plurality of bolts 13. The radially outward flange 24 provided on the outer ring 21 of the rolling bearing 2 is mounted to a vehicle body 5 or the like by means of a bolt. The input shaft 6 is spline fitted to the inner ring 32 of the constant velocity joint 3 and secured by a locating snap ring (reference numeral not shown) or the like so that the input shaft 6 does not fall out. The other end of the input shaft 6 is mounted to a differential apparatus of a vehicle through another constant velocity joint (not shown). A reference number 7 represents a brake pad 7.

In such a bearing apparatus, a rotation force of the input shaft 6 is transmitted to the wheel (not shown) mounted to the hub wheel 1 through the constant velocity joint 3.

Coupling mode of the outer ring 31 of the constant velocity joint 3 to the hub wheel 1 will be explained.

A vehicle-outer side opening of the hollow hole of the hub wheel 1 is increased in diameter. This diameter-increased vehicle-outer side opening is defined as a diameter-increased portion 15. This diameter-increased portion 15 has a predetermined depth in the axial direction from the vehicle-outer side.

A fixing ring 8 is a fixing member whose outer diameter side is fixed to a predetermined position of the hub wheel 1 on the vehicle-outer side and whose inner diameter side is smaller than a center hole of the hub wheel 1 in diameter. More specifically, the fixing ring 8 has an annular construction having an outer diameter capable of being press-fitted into the inner periphery of the diameter-increased portion 15 of the hub wheel 1. The fixing ring 8 is press-fitted into the diameter-increased portion 15 so that the fixing ring 8 is positioned and fixed in the axial direction and radial direction.

The press-fit force of the fixing ring 8 is set greater than an axial load (e.g., 200N) that can be applied to the outer ring 31 of the constant velocity joint 3 in the direction of the vehicle-outer side from a double off-set joint (not shown) connected to the input shaft 6. This press-fit force prevents the fixing ring 8 from falling out from the diameter-increased portion 15 against the axial load in the direction toward the vehicle-outer side.

The fixing ring 8 may be prevented from falling out by plastically deforming the vehicle-outer side opening of the hub wheel 1 and caulking the opening against the fixing ring 8, or by welding the fixing ring 8 against the vehicle-outer side opening of the hub wheel 1.

An inner diameter of the fixing ring 8 is set smaller than the hollow hole of the hub wheel 1, and is considered as, for example, one produced by shaving a metal block, or by turning a thick metal plate. In addition, a material of the fixing ring 8 may be resin or hard rubber.

A vehicle-outer side end of the outer ring shaft 36 of the constant velocity joint 3 is formed with a screw hole 38. A bolt 9 as a holding member is threadedly engaged with the screw hole 38 through the fixing ring 8.

The fixing ring 8 fixed to the hub wheel 1 is sandwiched in its axial direction between the vehicle-outer side end face of the outer ring shaft 36 and an inner end face of a head of the bolt 9 threaded into the screw hole 38 of the outer ring shaft 36 as the holding member. With this construction, the outer ring 31 of the constant velocity joint 3 is coupled to the hub wheel 1 in a state in which the outer ring 31 is positioned in the axial direction.

That is, an outer diameter side of the fixing ring 8 is fixed to an inner periphery of the diameter-increased portion 15 that is a predetermined position on the vehicle-outer side of the hub wheel 1, and in this fixed state, an inner diameter side of the fixing ring 8 is located between the bolt 9 as the holding member and the vehicle-outer side end face of the outer ring shaft 36 of the constant velocity joint 3.

In the mode of the coupling of the outer ring 31 of the constant velocity joint 3 to the hub wheel 1 mentioned above, a simple coupling operation suffices only to mount the bolt 9 to the outer ring shaft 36. Further, in the coupling process, the outer ring cylindrical portion 35 of the constant velocity joint 3 is not strongly pushed against the caulked portion 14 of the hub wheel 1 unlike the conventional art. As a result, the pre-load that has been applied to the rolling bearing 2 is maintained invariably. Therefore, a required pre-load may be applied to the rolling bearing 2 only when the hub wheel 1 is caulked and thus, its management becomes easy.

Based on this, a relation between the caulked portion 14 of the hub wheel 1 and the outer ring cylindrical portion 35 of the constant velocity joint 3 may be designed arbitrarily.

This embodiment is designed in such a state that the outer ring cylindrical portion 35 of the constant velocity joint 3 is not in contact with the caulked portion 14 of the hub wheel 1. In this case, the fastening force of the bolt 9 when the outer ring 31 of the constant velocity joint 3 is coupled to the hub wheel 1, and the axial load that can be applied from a tripod joint (not shown) connected to the input shaft 6 to the outer ring 31 of the constant velocity joint 3 in the direction toward the vehicle-outer side are not applied to the caulked portion 14 at all. Therefore, the pre-load applied to the rolling bearing 2 at the time of caulking becomes invariable, and the pre-load is maintained as designed. Thus, the rolling characteristics and life of the rolling bearing 2 can be achieved as designed.

In this case, although a gap is produced between the caulked portion 14 and the outer ring cylindrical portion 35, since the gap is sealed by a seal 40, it is possible to prevent water from entering the spline fitting portion between the hub wheel 1 and the outer ring shaft 36 of the constant velocity joint 3. In addition, although it is not illustrated in the drawing, one or a plurality of O-rings or other various known seals may be interposed on arbitrary positions of the opposed surfaces between the caulked portion 14 and the outer ring cylindrical portion 35. In this case, it is possible to certainly prevent water from entering the spline fitting portion between the hub wheel 1 and the outer ring shaft 36 of the constant velocity joint 3.

The seal 40 consists of a seal ring 41 and a slinger 42. The seal ring 41 has a structure where a core metal coated with a lip made of a resilient material. The core metal is fitted into an inner peripheral surface shoulder portion of the outer ring 21 of the rolling bearing 2 by press-fit. The lip has a radial lip and an axial lip. The radial lip is in contact with the outer peripheral surface of the inner ring 25 of the rolling bearing 2. The axial lip is in contact with the slinger 42. The slinger 42 consists of a metal ring whose radially upper half has U-shaped cross section, and is fitted to the outer peripheral surface of the outer ring cylindrical portion 35 of the constant velocity joint 3 by press-fit, and is in a mode that its outer cylindrical portion is opposed to the core metal of the seal ring 41 with a fine gap therebetween.

Figure 3:
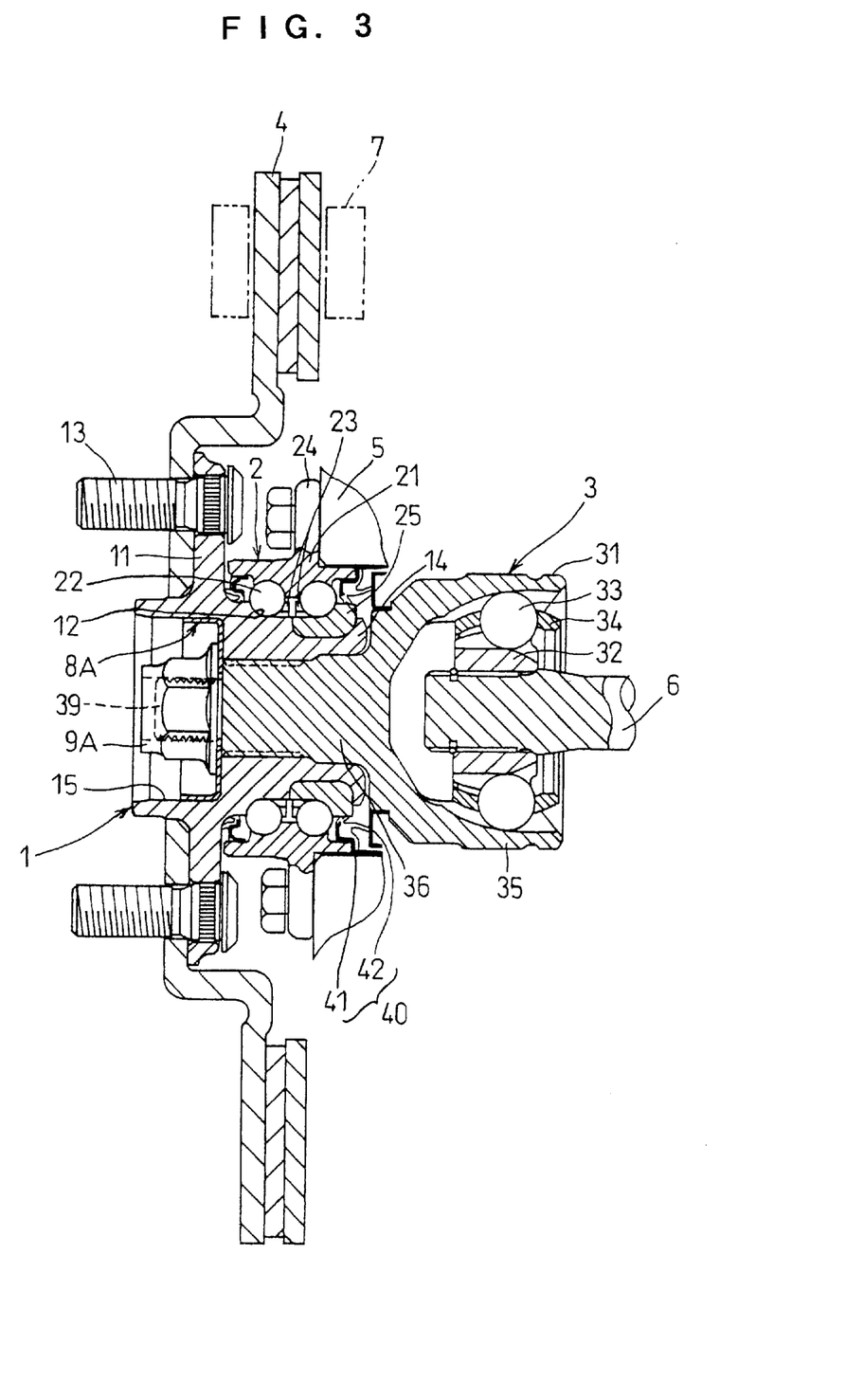
FIG. 3 is a sectional view showing a bearing apparatus for a vehicle of another preferred embodiment of the invention.
Figure 4:
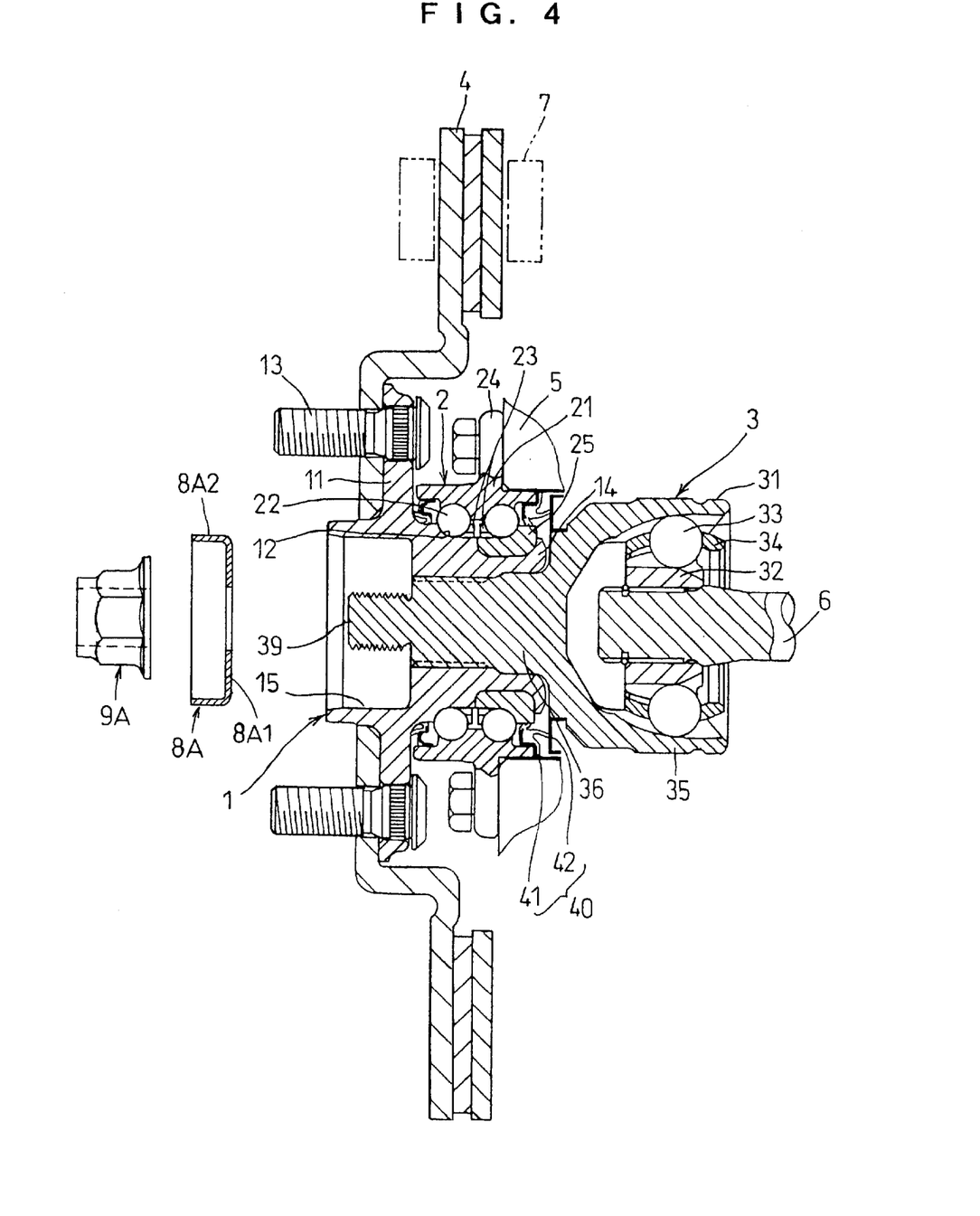
FIG. 4 is a view showing assembling process of the bearing apparatus shown in FIG. 3.

Another preferred embodiment of the present invention will be explained with reference to FIGS. 3 and 4. In the case of a bearing apparatus shown in these drawings, a fixing ring 8A created in a bottomed cylindrical shape formed by pressing a metal plate is used. A nut 9A is used as the fastening member instead of the bolt 9.

The fixing ring 8A includes a bottom 8A1 having a through hole through which a small-diameter projection 39 can be inserted in the axial direction, and a cylindrical portion 8A2 having an outer diameter capable of being press-fitted into the diameter-increased portion 15 of the hub wheel 1 as well as continuously formed on the bottom 8A1. If the cylindrical portion 8A2 is press-fitted into the diameter-increased portion 15 of the hub wheel 1 in a state in which the bottom 8A1 is directed to the diameter-increased portion 15, the fixing ring 8A is fixed in a state in which the fixing ring 8A is positioned at inner periphery in the diameter-increased portion 15 in its axial direction and radial direction. This press-fit force is set in the same manner as that of the previous embodiment.

Since the nut 9A is used in this embodiment, the small-diameter projection 39 mentioned above projects from a vehicle-outer side end edge of the outer ring shaft 36 of the constant velocity joint 3. A male screw is arranged on the outer periphery in this small-diameter projection 39. The nut 9A is threadedly engaged with the small-diameter projection 39 through the fixing ring 8A.

In the case of this embodiment, the fixing ring 8A fixed to the hub wheel 1 is sandwiched between the vehicle-outer side end face of the outer ring shaft 36 of the constant velocity joint 3 and an inner end face of the nut 9A by adjusting the engaging position of the nut 9A with respect to the small-diameter projection 39. With this construction, the outer ring 31 of the constant velocity joint 3 is coupled to the hub wheel 1.

Figure 5:
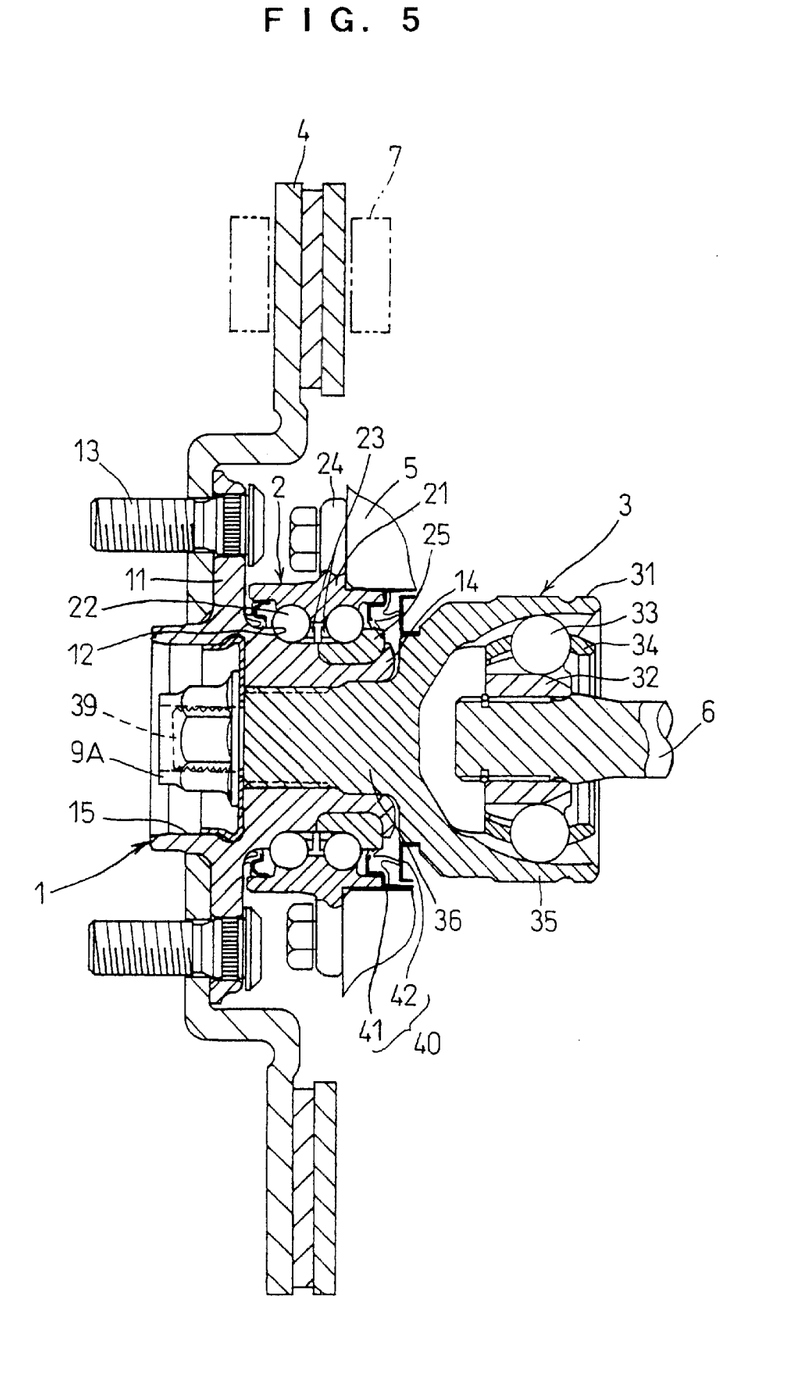
FIG. 5 is a sectional view showing a modification of the bearing apparatus shown in FIG. 3.
Figure 6:
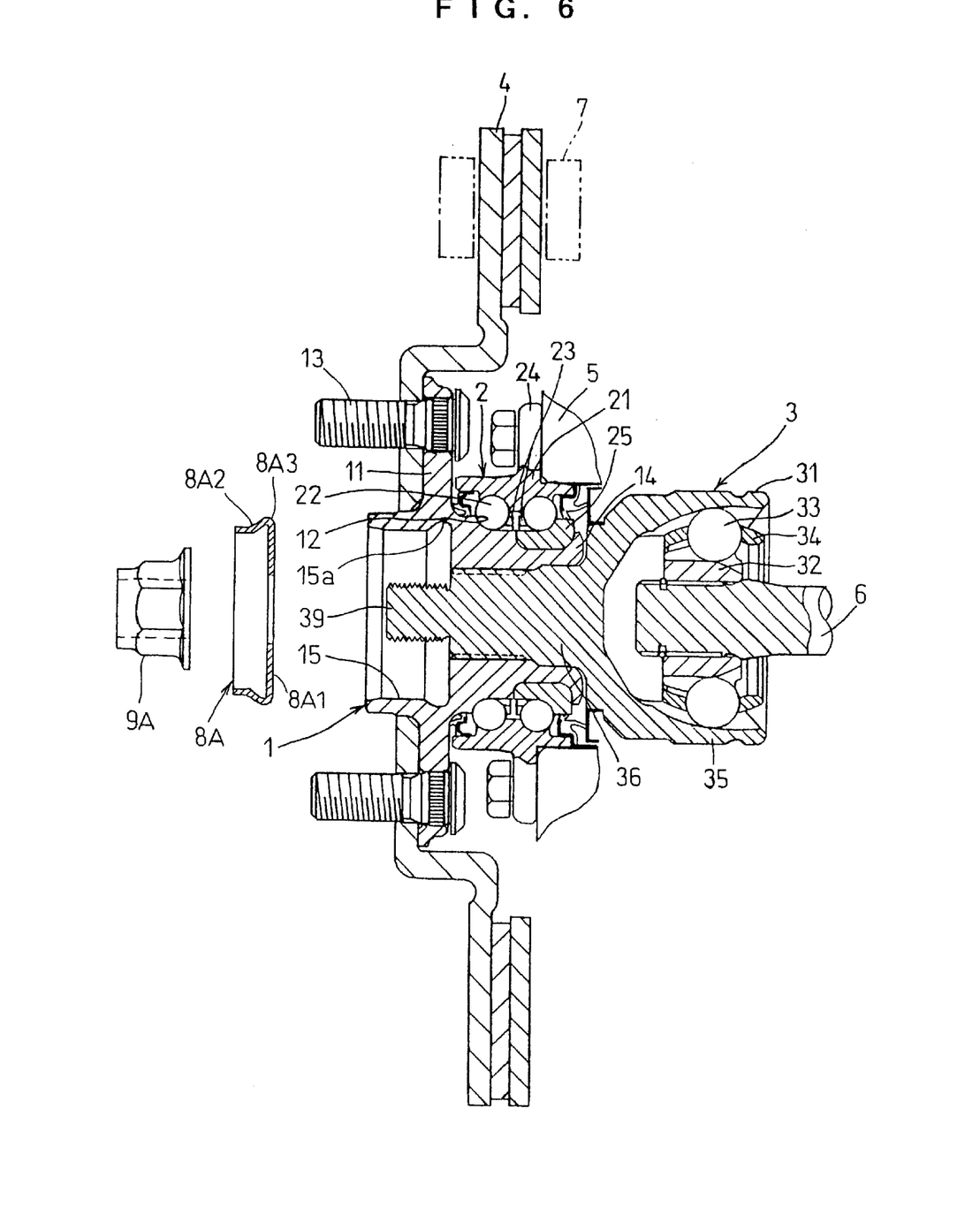
FIG. 6 is a view showing assembling process of the bearing apparatus shown in FIG. 5.

In the above description, the bolt 9 may be used instead of the nut 9A. As shown in FIGS. 5 and 6, a swelling portion 8A3 swelling radially outwardly is provided at the cylindrical portion 8A2 in the fixing ring 8A. A diameter-increased portion 15 of the hub wheel 1 is provided with a groove 15a. A swelling portion 8A3 is retained in the groove 15a. With this construction, the fixing ring 8A is prevented from falling out more strongly. In this case, since the press-fit force of the fixing ring 8A can be reduced if necessary, its assembling operation thereof is facilitated.

In the above embodiment, a shape of the diameter-increased portion 15 of the hub wheel 1 and outer shapes of the fixing rings 8 and 8A are set circular, but the shapes may be polygonal, elliptic or other shapes.

Although the hub wheel 1 is provided with the diameter-increased portion 15, the diameter-increased portion 15 may not be provided, an outer diameter side of the fixing ring 8 may be fixed to the vehicle-outer side end face of the hub wheel 1 by a fastening mechanism such as a bolt or a fixing mechanism such as welding, an inner diameter side of the fixing ring 8 may be sandwiched between the bolt 9 and the outer ring shaft 36 of the constant velocity joint 3, and the outer ring 31 of the constant velocity joint 3 may be coupled to the hub wheel 1. In such a case, the fixing member is not limited to a ring shape such as the fixing ring 8 only if the member has the outer diameter side and the inner diameter side.

Although the outer ring shaft 36 of the constant velocity joint 3 is prevented from rotating by the spline fitting into the hollow hole of the hub wheel 1 in the above embodiments, a hole shape of the hollow hole of the hub wheel 1 and outer shapes of the outer ring shaft 36 may be set polygonal, elliptic or other shapes.

Although the outer ring cylindrical portion 35 of the constant velocity joint 3 is maintained in non-contact with the caulked portion 14 of the hub wheel 1 in the above embodiments, they may be in slight contact with each other. This slight contact means a contact within which pre-load of the rolling bearing exceeding a proper value is not applied.

In this case, the fastening force of the bolt 9 when the outer ring 31 of the constant velocity joint 3 is engaged with the hub wheel 1 is hardly applied to the caulked portion 14. Therefore, the pre-load applied to the rolling bearing 2 at the time of caulking is maintained substantially invariably.

Although the bolt 9 or nut 9A is used as the pressing member abutted against the fixing ring 8 or 8A in the above embodiments, a locating snap ring may be used instead. The locating snap ring may be engaged with a peripheral groove formed in the outer ring shaft 36.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A bearing apparatus for a vehicle, comprising:
a hub wheel having a hollow hole;
a rolling bearing mounted to an outer periphery of said hub wheel;
a constant velocity joint for connecting an input shaft to said hub wheel such that said input shaft can incline, said constant velocity joint having an outer ring including a cylindrical portion in which an inclination guide element with respect to said input shaft is accommodated and a shaft continuously formed on the cylindrical portion and fitted into said hollow hole of said hub wheel in a state in which said outer ring shaft is prevented from rotating in said hollow hole of said hub wheel in its circumferential direction;
a pressing member mounted to said outer ring shaft of said constant velocity joint; and
a fixing member whose outer diameter side is fixed to a predetermined position of said hub wheel on a vehicle-outer side and whose inner diameter side is smaller than said hollow hole of said hub wheel, wherein
said fixing member is sandwiched between said pressing member and a vehicle-outer side end face of said outer ring shaft in the axial direction so that said outer ring of said constant velocity joint is coupled to said hub wheel.

2. The bearing apparatus for a vehicle according to claim 1, wherein
a vehicle-outer side opening of said hollow hole of said hub wheel is increased in diameter to form a diameter-increased portion,
said fixing member is fixed to in the diameter-increased portion of said hub wheel.

3. The bearing apparatus for a vehicle according to claim 2, wherein
said fixing member is a fixing ring having an outer diameter side fitted and fixed to said diameter-increased portion of said hub wheel by press-fitting,
a vehicle-outer side end of said outer ring shaft of said constant velocity joint has a screw hole,
said pressing member is a bolt threadedly engaged in said screw hole,
said fixing ring is sandwiched between said vehicle-outer side end face of said outer ring shaft and an inner end face of a head of said bolt threadedly engaged in said screw hole in its axial direction in a state in which said fixing ring is positioned at least in its axial direction.

4. The bearing apparatus for a vehicle according to claim 2, wherein
said fixing member is fixed to the diameter-increased portion of said hub wheel by press-fitting, this press-fit force is set greater than an axial load applied to the outer ring of said constant velocity joint in a direction of the vehicle-outer side.

5. The bearing apparatus for a vehicle according to claim 2, wherein
said fixing member is a fixing ring having an outer diameter side that can be fixed to said diameter-increased portion of said hub wheel by press-fitting,
the vehicle-outer side end of said outer ring shaft of said constant velocity joint has a small-diameter projection,
a male screw is provided on an outer periphery of said small-diameter projection,
said pressing member is a nut threadedly engaged with an outer periphery of said small-diameter projection,
said fixing ring is mounted to said small-diameter projection, and said nut is mounted to said small-diameter projection,
said fixing ring is sandwiched between said nut and the vehicle-outer side end face of said outer ring shaft by the threadedly engagement of said nut to said small-diameter projection so that said outer ring of said constant velocity joint is coupled to said hub wheel.

6. The bearing apparatus for a vehicle according to claim 5, wherein
said fixing ring includes a bottom having a through hole through which said small-diameter projection can be inserted in its axial direction and a cylindrical portion continuously formed on said bottom, said fixing ring is press-fitted into said diameter-increased portion in a state in which said bottom is directed into said diameter-increased portion, and said fixing ring is mounted to said small-diameter projection through said through hole.

7. The bearing apparatus for a vehicle according to claim 6, wherein
said fixing ring is formed with a radially outward swelling portion formed on the cylindrical portion of said fixing ring on the vehicle-inner side,
said diameter-increased portion of said hub wheel is formed with a groove on the vehicle-inner side,
said swelling portion is engaged in said groove in a state in which said fixing ring is press-fitted into said diameter-increased portion so that said fixing ring is prevented from falling out to the vehicle-outer side.

8. The bearing apparatus for a vehicle according to claim 1, wherein
said hollow hole of said hub wheel is provided with a female spline, said outer ring shaft of said constant velocity joint is provided with a male spline,
said outer ring shaft is prevented from rotating in a circumferential direction with respect to said hub wheel by means of fitting of both said splines.

9. The bearing apparatus for a vehicle according to claim 8, wherein
said spline fitting has a margin between biting teeth.

10. The bearing apparatus for a vehicle according to claim 1, wherein
an shaft end of said hub wheel on the vehicle-inner side is bent and deformed radially outward, said shaft end is caulked on an outer end face of a vehicle-inner side inner ring of said rolling bearing and is formed as a caulked portion,
said cylindrical portion of said outer ring of said constant velocity joint is in no contact or in slight contact with said caulked portion of said hub wheel.

* * * * *